(No Model.) 5 Sheets—Sheet 1.

H. S. TOWNSEND & G. A. SCHNEEBELI.
STOP MOTION FOR CIRCULAR KNITTING MACHINES.

No. 451,628. Patented May 5, 1891.

WITNESSES:

INVENTORS, (No Model.) 5 Sheets—Sheet 3.

H. S. TOWNSEND & G. A. SCHNEEBELI.
STOP MOTION FOR CIRCULAR KNITTING MACHINES.

No. 451,628. Patented May 5, 1891.

WITNESSES: INVENTORS, (No Model.) 5 Sheets—Sheet 4.
H. S. TOWNSEND & G. A. SCHNEEBELI.
STOP MOTION FOR CIRCULAR KNITTING MACHINES.
No. 451,628. Patented May 5, 1891.
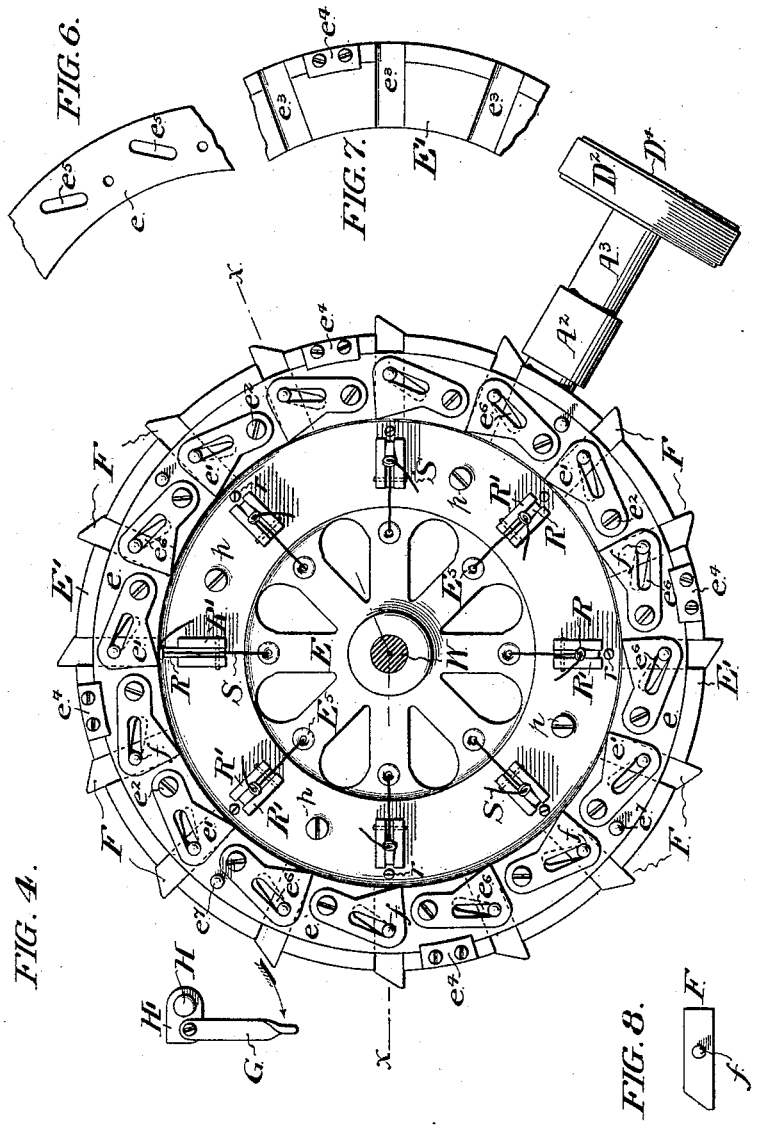

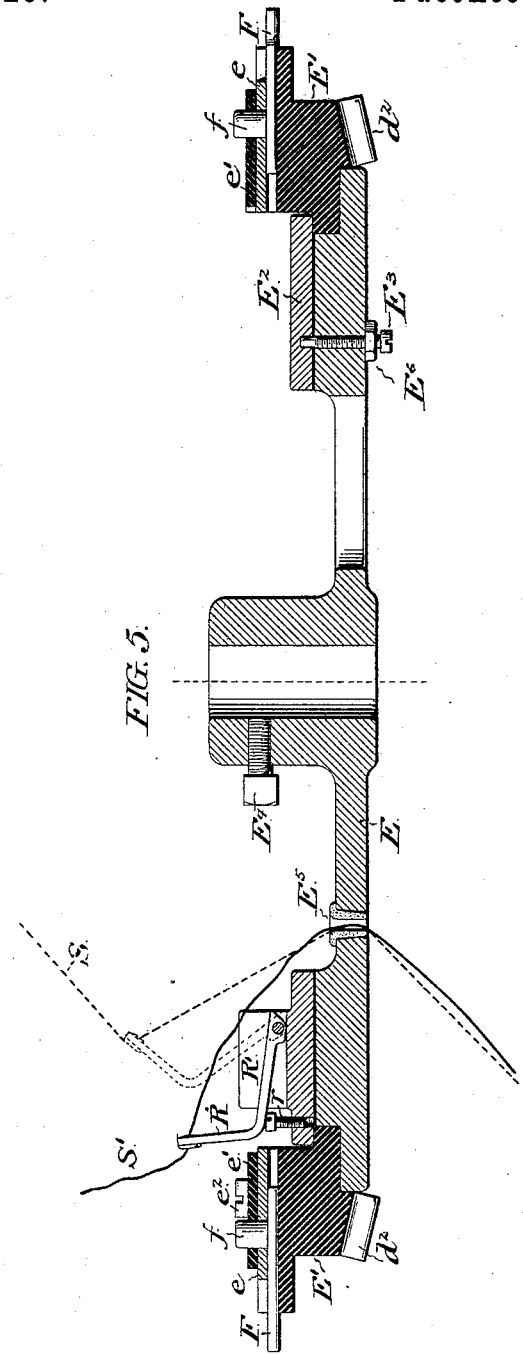

UNITED STATES PATENT OFFICE.

HARRY S. TOWNSEND AND GUSTAV ADOLPH SCHNEEBELI, OF NAZARETH, PENNSYLVANIA.

STOP-MOTION FOR CIRCULAR-KNITTING MACHINES.

SPECIFICATION forming part of Letters Patent No. 451,628, dated May 5, 1891.

Application filed November 17, 1890. Serial No. 371,754. (No model.)

*To all whom it may concern:*

Be it known that we, HARRY S. TOWNSEND and GUSTAV ADOLPH SCHNEEBELI, both of Nazareth, county of Northampton, and State of Pennsylvania, have invented certain new and useful Improvements in Stop-Motions for Circular-Knitting Machines, whereof the following is a specification, reference being had to the accompanying drawings.

In Letters Patent of the United States No. 436,010, granted to us under date of September 9, 1890, we have described and claimed certain stop-motion devices whose operation depends upon the position of a movable tumbler mounted upon a rotating member of the knitting-machine and tending to engage with a rotatable ring which controls the belt-shifting mechanism, said tumbler being prevented from such engagement by the yarn in normal travel, but becoming operative under variations of such travel. The present invention, while also depending upon the action of a tumbler similarly controlled by the yarn, differs, primarily, from our former invention, in that the stop-motion ring rotates instead of the tumbler, and it may therefore be considered as the correlative of such former invention.

Figure 1:
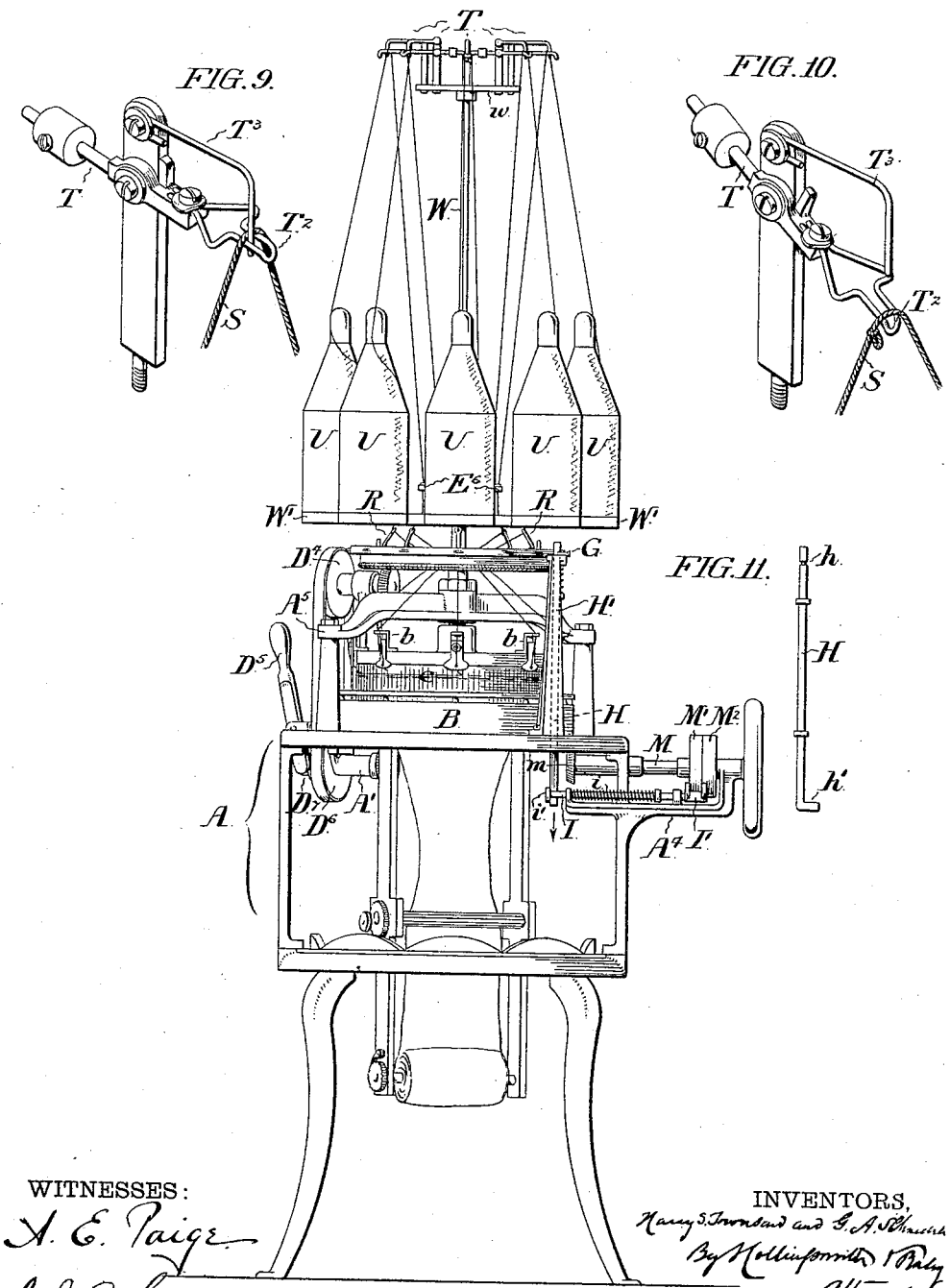
Figure 2:
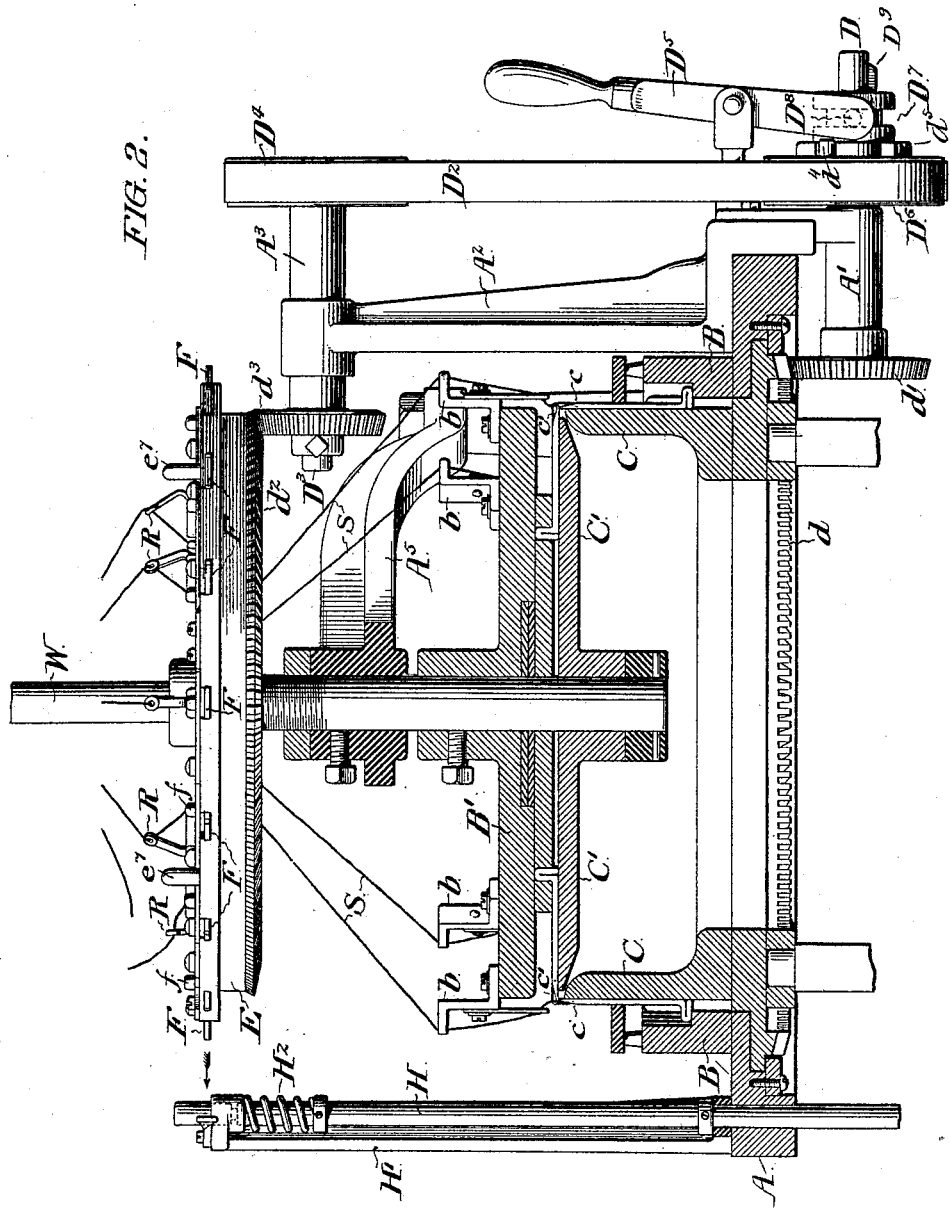
Figure 3:
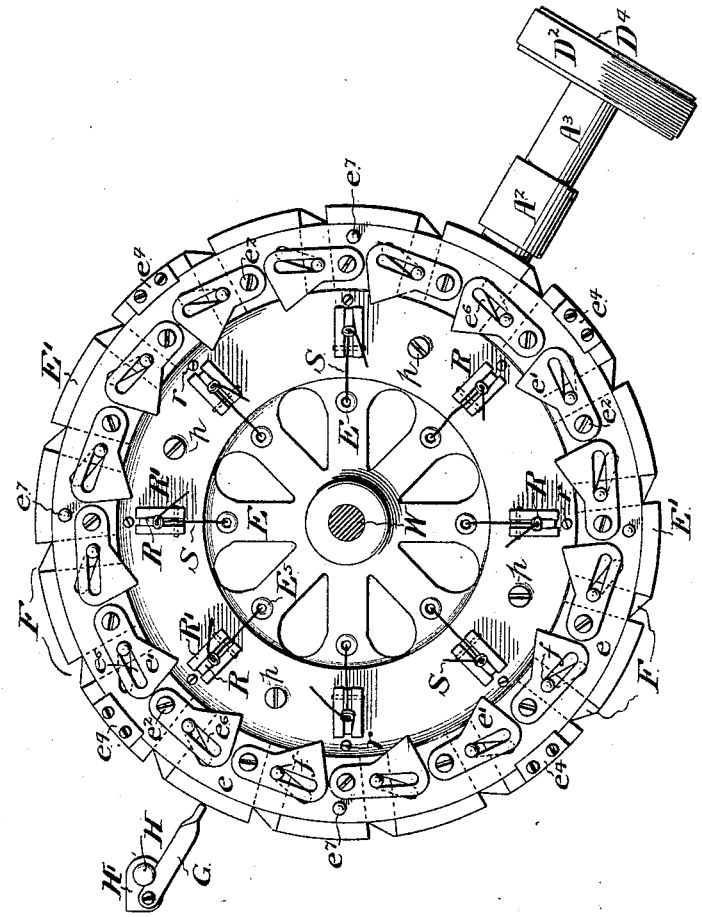

In the accompanying drawings, Figure 1 represents a general view in elevation of a knitting-machine to which our present invention is applied, the details of the knitting mechanism proper and other adjuncts being omitted in this and the remaining figures, since the construction thereof is well understood and has no immediate relation to the stop-motion devices. Fig. 2 is a view on an enlarged scale, partly in vertical central section, through the needle-cylinder, cam-cylinder, and stop-motion ring, and partly in side elevation. Fig. 3 is a top or plan view of the stop-motion ring and the tumbler in a position corresponding to the normal travel of the yarn. Fig. 4 is a similar view of said devices immediately after they have become operative in consequence of abnormal action of one of the yarns. Fig. 5 is a vertical central section, on a still larger scale, through the tumbler-supporting frame and stop-motion ring on the lines $xx$ of Fig. 4. Figs. 6 and 7 are short segments of the respective members which together make up said ring, and Fig. 8 is a view of the radially-sliding tooth carried by said ring and engaging directly with the belt-shifting mechanism. Figs. 9 and 10 are perspective views, on a larger scale, of the latch-levers which support the yarn in its travel to the tumblers, showing said levers in two different positions; and Fig. 11 is a detail view of the rod which directly controls the operation of the belt-shifting rod proper.

Referring to the general views, A represents the table or stand of the machine; B, the cam-cylinder; C, the rotating needle-cylinder having needles $c$ and actuated in the usual way by means of a bevel-gear $m$, mounted upon the main driving-shaft M, which shaft is provided with a fast pulley M' and a loose pulley $M^2$. The spring-actuated rod I is mounted upon the brackets $A^4$ of the stand and carries at its outer end belt-guiding fingers I', the spring $i$ of said rod tending normally to throw the belt toward the loose pulley. The other end of said rod I is provided with a head $i'$, which engages with a foot $h'$ upon the lower end of a rod H, sliding vertically in a guide-piece H' upon the table and arranged in proximity to the outer periphery of the cam-cylinder. Said rod H has near its upper end a spring $H^2$, which tends to throw it normally downward, and it is also provided at its upper end with a notch $h$, (see Fig. 11,) with which a pivoted finger G engages, said finger being mounted upon the top of the vertical guide-piece H' and projecting inward some distance above the needle-cylinder.

The spring-actuated rod I, with its belt-guides, and the spring-actuated rod H, engaging therewith and controlled by said pivoted finger, will hereinafter be referred to by the general words "belt-shifting mechanism," and, while they constitute the preferred form, it must be understood that we do not limit ourselves to the use of this particular mechanism for the purpose.

The knitting-machine is shown in the present instance as also provided with a rotating dial-plate C', having horizontal needles $c'$, which are actuated by cams upon the stationary cam-disk B', upon which are mounted thread-guides $b$ for the yarns S. The central stationary supporting-rod W for the bobbin-frame, &c., is suspended by means of bracket-arms $A^5$ in the usual manner, and upon said rod above the arms we mount a wheel-shaped frame E, which carries the tumblers R, pivoted between guiding-lugs R' and capable of dropping radially outward upon their pivots, as in our said former patent. Said tumblers of course correspond in number with the number of feeds which are to be used, and each tumbler is provided at its upper or free end with an eye through which the yarn passes. The downward motion or fall of the tumblers may be limited by contact with the heads of screws $r$, by which the extent of drop may be regulated. Intermediate between the tumblers and the center of their supporting-frame E are thread-eyes $E^5$.

Upon a horizontal frame $w$, mounted near the top of the rod W, are arranged the latch-levers, whose details are shown in Figs. 9 and 10. These levers have been fully described in our said patent, and it is therefore only necessary to state that they consist of weighted levers T, having at one end a wire loop $T^2$, into which a downwardly-depending finger $T^3$ extends. The yarn S is led over said wire loop inside of the finger $T^3$, and the lever is so nearly balanced that it will yield, as shown in Fig. 10, upon contact with a knot or other obstruction in the yarn and permit the yarn to drop. The yarn-bobbins U are mounted upon a plate or table W', carried upon the rod W, and from thence the several yarns are led up to the latch-levers, thence down again to a series of thread-eyes $E^6$ in close proximity to the rod, thence are led outward through the eyes upon the respective tumblers, thence inward again through the eyes $E^5$, and thence pass to the guides $b$ adjacent to the needles. The periphery of the tumbler-frame E is recessed upon its upper side, as shown in Fig. 5, to provide a flat annular bearing-surface for the rotatable stop-motion ring. Said stop-motion ring is a composite structure consisting of a lower annulus E', having beveled teeth $d^2$ upon its under side and grooved radially at intervals upon its upper side, as indicated in Fig. 7. The radial grooves $e^3$ upon the annulus E' constitute seats for radially-sliding pieces F, having vertical studs or pins $f$. These studs are of such length that when shifted inward their outer ends will be flush with the outer periphery of the annulus E' and when protruded they will reach the hinged finger G. For convenience of description said strips will hereinafter be referred to as the "striking-teeth." A second flat annulus $e$, of less external diameter than the lower one, rests freely upon the top thereof and is maintained in position by overhanging guide-pieces $e^4$, mounted at intervals upon the periphery of the latter. Said annulus $e$ is provided with inclined slots $e^5$, (see Fig. 6,) said slots corresponding in number with the striking-teeth and being adapted to fit over and receive the pins $f$ upon said teeth. Owing to the inclination of the slots $e^5$, rotation of the annulus $e$ relatively to the annulus E' will shift the striking-teeth in one direction or the other, and thus cause their protrusion into or withdrawal from the range of contact with the finger G.

Upon pivots $e^2$, mounted upon the annulus $e$ intermediate with the slots $e^5$, are hung the internally-projecting cam-pieces $e'$, each of which is provided with a slot $e^6$, fitting over the pins $f$, said slots being slightly inclined outward. Each of said cam-pieces $e'$ is formed with an abrupt inward projection or angular corner, and when the cam-piece is swung into the outermost position the point of said projection will be substantially flush with the inner periphery of the annulus $e$; but when the cam-piece is in its extreme inward position the corner or point will be within the range of any tumbler which is in a fallen position. The inclination of the slot $e^6$ in the cam-piece is such that the outward movement of the striking-tooth and consequent shifting of the pin $f$ along said slot will swing the cam-piece outward into its extreme position.

The compound stop-motion ring rests, as before stated, upon an annular bearing-recess formed upon the upper periphery of the tumbler-frame E, and to prevent the stop-motion ring from being accidentally lifted from said bearing-surface we prefer to construct the upper peripheral surface of the tumbler-frame of the form of a removable ring $E^2$, (see Fig. 5,) slightly overhanging an inwardly-projecting flange upon the inner surface of the base-annulus E'. Said ring $E^2$ is secured to the tumbler-frame E by means of screws $p$; but to adjust its pressure upon the flange of the base-annulus and to take up the wear we provide set-screws $E^3$, which extend outward through the lower portion of the tumbler-frame and enter recesses in the under side of the ring $E^2$. Each of said screws has a jam-nut $E^6$ to prevent accidental displacement.

The stop-motion ring is rotated by means of a bevel-gear $d^3$, which engages with the teeth $d^2$, formed on the under side of the base-annulus E'. Said bevel-gear $d^3$ is carried upon the inner end of a shaft $D^3$, supported in a sleeve-bearing $A^3$, which is mounted upon the post $A^2$, projecting upward from the table in close proximity to the cam-cylinder B. The outer end of the shaft $D^3$ is provided with a pulley $D^4$, driven by means of a belt $D^2$ from the pulley $D^6$, which is mounted freely upon the shaft D. The shaft D is supported in a hanging bearing A', suspended beneath the table-top, and is provided at its inner end with a bevel-gear $d'$, which engages with the teeth $d$, formed on the bottom flange of the needle-cylinder C.

The shaft D is provided with a spline or feather $D^9$, upon which a coupling-collar $D^7$ slides freely longitudinally. Said coupling-collar is provided at that end which is next to the pulley $D^6$ with an annular flange $d^5$, a portion of whose periphery is cut away, so as to form an abrupt shoulder capable of engagement with a stud $d^4$, mounted in the proximate face of the pulley $D^6$. A hand-lever $D^5$ is mounted above the shaft D and the lower end of said lever is bifurcated, so as to partly embrace the coupling-collar $D^7$. Studs $D^8$ project inwardly from the bifurcations of the lever $D^5$ and engage freely in a groove formed around the entire periphery of the collar, thus permitting its free rotation, but adapting it to be shifted toward or from the pulley $D^6$ by the movement of the hand-lever.

The operation of the device is as follows: At the commencement of knitting and before the yarns have attained their normal tension and raised the tumblers R the coupling-collar $D^7$ is thrown outward, so as to disconnect it from the pulley $D^6$. The operator shifts the annulus $e$ relatively to the annulus E, the movement (in the present form of the machine) being toward the left or against the hands of a watch. Studs $e^7$, mounted upon the annulus $e$, afford a convenient means of taking hold thereof for this purpose. This movement by the action of the inclined slots $e^5$ upon the pins $f$ shifts the striking-teeth inward, and by a similar action upon the slots $e^6$ of the cam-pieces $e'$ shifts said cam-pieces also inward, so that their corners or points protrude inwardly to the extreme distance. The relative positions under these circumstances are shown in Fig. 3, and thereupon the hand-lever $D^5$ is shifted so as to couple the pulley $D^6$ to the shaft D. The compound stop-motion ring will thereupon be rotated continuously by means of the gear $d^3$. If now one of the yarns should break, or if by the occurrence of a knot or obstruction a yarn should be released from the end $T^2$ of a latch-lever, the tension will immediately be released and the tumbler of said yarn will drop outward. When the rotation of the stop-motion ring brings one of the cam-pieces $e'$ into contact with said tumbler, the rotation of the upper annulus $e$ will be arrested, and as the lower annulus $E'$ continues to rotate the pins $f$ must travel along the slots $e^5$ of the upper annulus and the slots $e^6$ of the cam-pieces. This movement of the pins will, as before stated, cause, on the one hand, the protrusion of the striking-teeth and on the other hand the gradual withdrawal of the cam-pieces from the range of contact with the fallen tumbler, such withdrawal being completely accomplished simultaneously with the complete protrusion of the striking-teeth. As the rotation of the compound ring continues, with its striking-teeth now protruded, one of said teeth will strike against the finger G and disengage the spring-actuated rod H, which controls the belt-shifting rod. The relative position of the parts at the moment of this occurrence is shown in Fig. 4, where the fallen tumbler is indicated at the top of the figure. It is also shown in the solid lines of Fig. 5. The release of the rod H permits the operation of the belt-shifting devices, as before described, and the knitting operation accordingly ceases.

Having thus described our invention, we wish it to be understood that under some circumstances other belt-shifting mechanism may be employed and other means may be devised of causing or permitting the operation thereof by the action of a striking-tooth or similar moving part upon the stop-motion ring. Hence in using the words "belt-shifting mechanism" in our claims we do not intend to limit ourselves to the precise form shown.

We claim—

1. The combination, with belt-shifting mechanism, substantially as set forth, of a tumbler mounted upon a stationary portion of the machine and adapted to be held in a raised position by the yarn in normal travel to the knitting mechanism, a stop-motion ring rotatably mounted in proximity to said tumbler and to said belt-shifting mechanism, a movable striking-tooth upon said ring normally out of the range of contact with said belt-shifting mechanism, but capable of engagement therewith when in an extreme position, means, substantially as set forth, for moving said tooth into said extreme position by engagement with the fallen tumbler, and actuating mechanism for said ring, substantially as set forth.

2. The combination, with belt-shifting mechanism substantially as set forth, of a stationary tumbler-frame, a series of tumblers mounted thereon and adapted to be held in a raised position by the yarn in normal travel to the knitting mechanism, a stop-motion ring rotatably mounted in proximity to said tumblers, a series of striking-teeth mounted upon said ring and normally out of range of contact with said belt-shifting mechanism, but capable of protrusion into engagement therewith, a series of pivoted cam-pieces also mounted upon said ring and projecting within the periphery of the same to points out of range of the raised tumblers, but within the range of a fallen tumbler, means, substantially as set forth, whereby upon contact between one of said cam-pieces and a tumbler said striking-teeth shall be protruded and said cam-pieces withdrawn from contact with said fallen tumbler, and actuating mechanism for said ring, substantially as set forth.

3. The composite stop-motion ring consisting of the following parts in combination: a rotatable base-annulus having grooves at intervals upon its upper surface, striking-teeth mounted to slide within said grooves, pins upon said teeth, a second annulus mounted upon the first one and rotatable with relation thereto, said second annulus being provided with inclined slots for the entry of said pins, respectively, and a series of pivoted cam-pieces projecting within the inner periphery of the composite ring, said cam-pieces being provided with slots also adapted to engage with said pins, substantially as set forth.

4. The combination, with the circular tumbler-frame having a series of tumblers radially mounted thereon, said frame having a bearing-recess around its periphery, of a base-annulus freely supported upon the recessed portion of said frame and provided with gear-teeth around an exposed part of its surface, radial striking-teeth mounted in said base-annulus, pins upon said teeth, a second annulus freely supported upon the first one and rotatable with reference thereto, said second annulus having a series of inclined slots to engage with said pins, respectively, a series of pivoted cam-pieces also slotted to engage with said pins and extending within the inner periphery of the base-ring into range of engagement with the fallen tumbler, and actuating mechanism operatively connected with the gear-teeth upon said base-annulus, substantially as set forth.

HARRY S. TOWNSEND.
GUSTAV ADOLPH SCHNEEBELI.

Witnesses:
ED HELLICK,
L. A. SCHNEEBELI.